US011765030B2

United States Patent
Krishan et al.

(10) Patent No.: US 11,765,030 B2
(45) Date of Patent: Sep. 19, 2023

(54) METHODS, SYSTEMS, AND COMPUTER READABLE MEDIA FOR REGISTERING APPLICATION FUNCTIONS USING COMMON APPLICATION PROGRAMMING INTERFACE FRAMEWORK

(71) Applicant: Oracle International Corporation, Redwood Shores, CA (US)

(72) Inventors: Rajiv Krishan, Bangalore (IN); Kiranmayi Boyapati, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/541,230

(22) Filed: Dec. 2, 2021

(65) Prior Publication Data
US 2023/0179481 A1 Jun. 8, 2023

(51) Int. Cl.
*H04L 41/0823* (2022.01)
*H04W 48/16* (2009.01)
*H04L 67/63* (2022.01)

(52) U.S. Cl.
CPC .......... *H04L 41/0823* (2013.01); *H04L 67/63* (2022.05); *H04W 48/16* (2013.01)

(58) Field of Classification Search
CPC ... H04L 67/12; H04L 67/535; H04L 41/0823; H04L 67/63; H04W 48/16
See application file for complete search history.

(56) References Cited

U.S. PATENT DOCUMENTS

| 11,303,731 | B2 | 4/2022 | Gupta et al. | |
| 11,503,662 | B2 * | 11/2022 | Tiwari | H04W 76/30 |
| 11,540,244 | B2 * | 12/2022 | Ge | H04W 60/00 |
| 2019/0261260 | A1 * | 8/2019 | Dao | H04W 48/18 |
| 2019/0372962 | A1 * | 12/2019 | Maria | H04L 63/108 |
| 2020/0396673 | A1 * | 12/2020 | Tiwari | H04W 60/00 |
| 2021/0274392 | A1 * | 9/2021 | Dao | H04W 36/18 |
| 2022/0022102 | A1 * | 1/2022 | Talat | H04W 80/10 |

(Continued)

FOREIGN PATENT DOCUMENTS

WO WO-2021224545 A1 * 11/2021

OTHER PUBLICATIONS

"3rd Generation Partnership Project; Technical Specification Group Core Network and Terminals; 5G System; Network Exposure Function Northbound APIs; Stage 3 (Release 16)," 3GPP TS 29.522, V16.9.0, pp. 1-185 (Sep. 2021).

(Continued)

*Primary Examiner* — David R Lazaro
(74) *Attorney, Agent, or Firm* — Jenkins, Taylor & Hunt, P.A.

(57) ABSTRACT

Methods, systems, and computer readable media for registering application functions (AFs) using common application programming interface (API) framework (CAPIF) are disclosed. One example method for registering AFs using CAPIF comprises: at a CAPIF node comprising at least one processor: receiving, from an AF, a registration trigger message comprising information about the AF; determining that the registration trigger message is valid; generating a custom NF registration message using the information about the AF; and sending the custom NF registration message to an NF repository function (NRF).

18 Claims, 8 Drawing Sheets

(56) References Cited

U.S. PATENT DOCUMENTS

| | | | | |
|---|---|---|---|---|
| 2022/0086218 | A1* | 3/2022 | Sabella | H04L 67/141 |
| 2022/0104162 | A1* | 3/2022 | Aggarwal | H04L 67/51 |
| 2022/0174483 | A1* | 6/2022 | Tiwari | H04W 48/18 |
| 2022/0386225 | A1* | 12/2022 | Sapra | H04L 43/0876 |
| 2023/0027164 | A1 | 1/2023 | Xu | |

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"3rd Generation Partnership Project; Technical Specification Group Core Network and Terminals; T8 reference point for Northbound APIs; (Release 16)," 3GPP TS 29.122, V16.11.0, pp. 1-408 (Sep. 2021).

"3rd Generation Partnership Project; Technical Specification Group Core Network and Terminals; Common API Framework for 3GPP Northbound APIs; (Release 16)," 3GPP TS 29.222, V16.7.0, pp. 1-149 (Jun. 2021).

"3rd Generation Partnership Project; Technical Specification Group Services and System Aspects; Functional architecture and information flows to support Common API Framework for 3GPP Northbound APIs; Stage 2 (Release 16)," 3GPP TS 23.222, V16.10.0 pp. 1-118 (Jun. 2021).

Commonly-Assigned, Co-pending U.S. Appl. No. 17/579,077 for "Methods, Systems, and Computer Readable Media for Health Checking Involving Common Application Programming Interface Framework," (Unpublished, filed Jan. 19, 2022).

"Common API Framework (CAPIF)," 3GPP, https://www.3gpp.org/common-api-framework-capif, pp. 1-4 (Sep. 30, 2019).

Notice of Allowance for U.S. Appl. No. 17/579,077 (dated Mar. 30, 2023).

* cited by examiner

US 11,765,030 B2

METHODS, SYSTEMS, AND COMPUTER READABLE MEDIA FOR REGISTERING APPLICATION FUNCTIONS USING COMMON APPLICATION PROGRAMMING INTERFACE FRAMEWORK

TECHNICAL FIELD

The subject matter described herein relates to improving communications in fifth generation (5G) and subsequent generation communications networks. More particularly, the subject matter described herein relates to methods, systems, and computer readable media for registering application functions (AFs) using common application programming interface (API) framework (CAPIF).

BACKGROUND

In telecommunications networks, a service endpoint is an address on a network node that uniquely identifies an entity that provides service to consumers.

The service endpoint can include an Internet protocol (IP) address or a combination of IP address and transport layer port number, which is also referred to as an IP endpoint.

In fifth generation (5G) telecommunications networks, the network node that provides service is referred to as a producer network function (NF). A network node that consumes services is referred to as a consumer NF. An NF can be both a producer NF and a consumer NF depending on whether it is consuming or providing service.

A given producer NF may have many service endpoints. Producer NFs register with an NF repository function (NRF). The NRF maintains NF profiles (e.g., data types or data structures for storing information about NF instances) of available NF instances and their supported services. Consumer NFs can subscribe to receive information about producer NF instances that have registered with the NRF. Once registered, NF instances in the 5G network may establish sessions with one or more network exposure functions (NEFs). Notably, the NEF is a 3GPP network function that provides a means to securely expose the services and capabilities provided by producer network functions servicing the network.

At present, 5G routing as defined in 3GPP utilizes binding information associated with a NEF to indicate a suitable target NF producer instance(s) for a number of network function events such as NF service instance selection, NF service instance reselection, and routing of subsequent requests associated with a specific NF producer resources and NF services. In particular, binding information allows an NF to indicate that the NF scope, for a particular context, that should be bound to an NF service instance, NF instance, NF service set, or NF set depending on local policies and other criteria. Notably, when an NEF has peers with shared context information (e.g., a common context data store), the NEF can be configured to push its binding information to an NF service set or an NF set. Thus, in the event a primary NEF instance (e.g., an NEF that handled an initial SMContext_Create request from a consumer NF, such as a session management function (SMF)) fails or otherwise becomes unavailable, the consumer NF can send an MO data notification request to an alternate (or peer) NEF instance. Although 3GPP standards permit a NEF to publish its binding information to consumer NFs, the 3GPP standards fail to define a process for an application function (AF) instance to publish binding information with an NEF for alternate selection during overload or other failure scenarios.

SUMMARY

Methods, systems, and computer readable media for registering application functions (AFs) using common application programming interface (API) framework (CAPIF) are disclosed. One example method for registering AFs using CAPIF comprises: at a CAPIF node comprising at least one processor: receiving, from an AF, a registration trigger message comprising information about the AF; determining that the registration trigger message is valid; generating a custom NF registration message using the information about the AF; and sending the custom NF registration message to an NF repository function (NRF).

One example system for registering AFs using CAPIF includes at least one processor, a memory, and a CAPIF node using the at least one processor and the memory. The CAPIF node configured for: receiving, from an AF, a registration trigger message comprising information about the AF; determining that the registration trigger message is valid; generating a custom NF registration message using the information about the AF; and sending the custom NF registration message to an NRF.

One example non-transitory computer readable medium comprising computer executable instructions embodied in the non-transitory computer readable medium that when executed by at least one processor of at least one computer cause the at least one computer to perform steps comprising: a CAPIF node comprising at least one processor: receiving, from an AF, a registration trigger message comprising information about the AF; determining that the registration trigger message is valid; generating a custom NF registration message using the information about the AF; and sending the custom NF registration message to an NRF.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
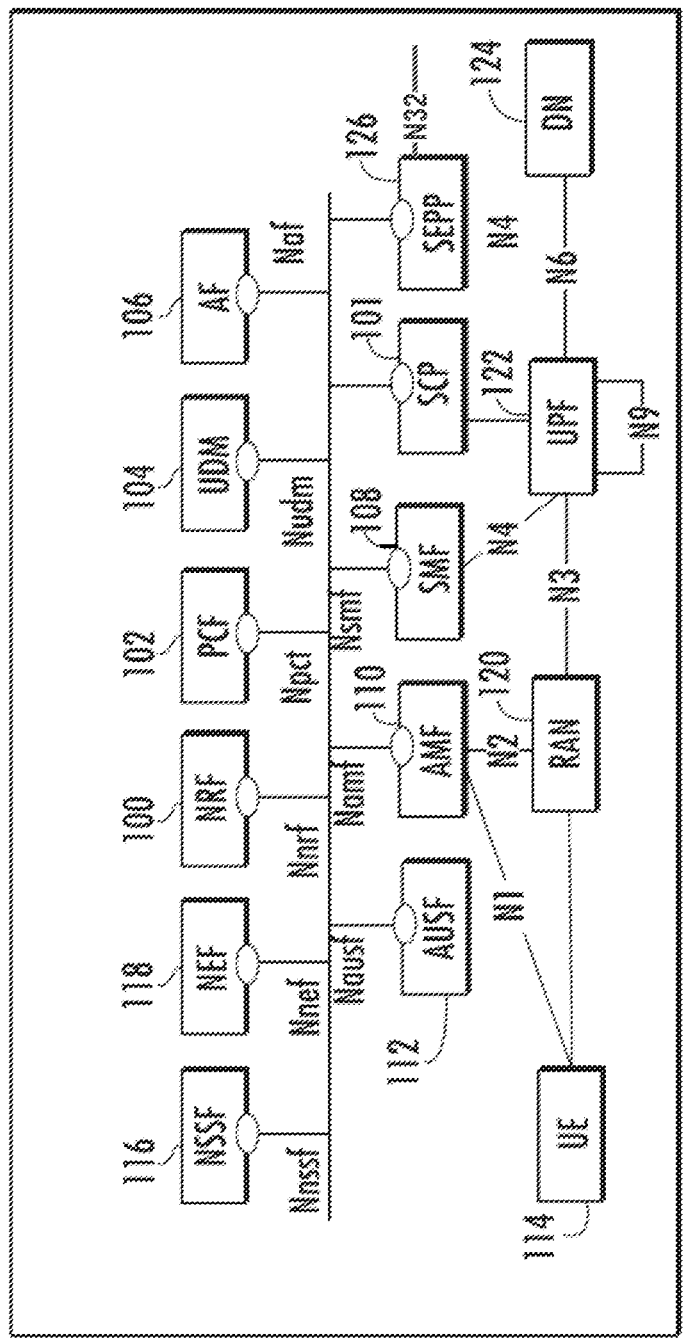
FIG. 1 is a network diagram illustrating an example fifth generation (5G) network architecture.

The subject matter described herein relates to methods, systems, and computer readable media for registering application functions (AFs) using common application programming interface (API) framework (CAPIF). In 5G communications networks, there are defined techniques to enable a network exposure function (NEF) to share context information with peer NEFs via messages that include binding headers. This mechanism is notably valuable for ensuring network stability in instance where an original or primary NEF instance fails or otherwise becomes unavailable by enabling a consumer NF (e.g., a service management function (SMF)) to send mobile originated (MO) data requests or other requests to alternate NEF instances associated with a common NF service set or NF set. However, there is currently no way for certain network functions (NFs) (e.g., AFs) to share binding information with NEFs or identify their respective peers in a similar manner. Moreover, AFs that are outside an operator's trust domain cannot register with an NF repository function (NRF), thereby hindering an NEF's ability to use NRF discovery procedures for discovering alternate routing information for those AFs. As such, during alternate routing, when an alternate NEF instance is used to send a notification (e.g., an MO data notification request message), the alternate NEF instance must send the notification to the AF instance that published its endpoint (e.g., a fully qualified domain name (FQDN) or Internet protocol (IP) address) to the primary NEF instance during an earlier context creation procedure. Thus, even if there is an alternate AF instance (e.g., a georedundant AF instance) closer to the alternate NEF instance (e.g., one in the same locality as the alternate NEF instance), the alternate NEF instance must still send the notification to the original AF instance.

In accordance with some aspects of the subject matter described herein, methods, systems, mechanisms, and/or techniques for registering AFs using a CAPIF node are provided. For example, a CAPIF node (e.g., a CAPIF core function (CCF) and/or API exposure function (AEF)) in accordance with various aspects described herein may be configured for: receiving, from an AF, a registration trigger message comprising information about the AF; determining that the registration trigger message is valid; generating a custom NF registration message using the information about the AF; and sending the custom NF registration message to an NF repository function (NRF).

In accordance with some aspects of the subject matter described herein, methods, systems, mechanisms, and/or techniques for allowing an NEF to discover, using an NRF, alternate AF instances that can receive notifications during a failure or an alternate routing scenario, thereby facilitating session continuity. For example, an NEF in accordance with various aspects described herein may allow alternate routing between NEF and AFs based on AF location information obtained from profiles registered with an NRF via a CAPIF node. In this example, the NEF may subscribe to and receive AF profiles from the NRF (after the AF profiles are registered with the NRF using the CAPIF node) and then the NEF may use the obtained profiles and stored context information to determine an appropriate AF instance during an alternate routing scenario.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example 5G system network architecture, e.g., a home 5G core (5GC) network. The architecture in FIG. 1 includes a network function (NF) repository function (NRF) 100 and a service communications proxy (SCP) 101, which may be located in the same home public land mobile network (PLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in 3GPP TS 29.510. The NF or service profile definition includes at least one of an FQDN, an IP version 4 (IPv4) address, or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs 126 usable for forwarding various communications (e.g., 5GC requests) between a consumer NF and a producer NF after applying application level security protection.

It will be appreciated that FIG. 1 is for illustrative purposes and that various nodes and/or modules, locations, and/or functionality described above in relation to FIG. 1 may be changed, altered, added, or removed.

Figure 2:
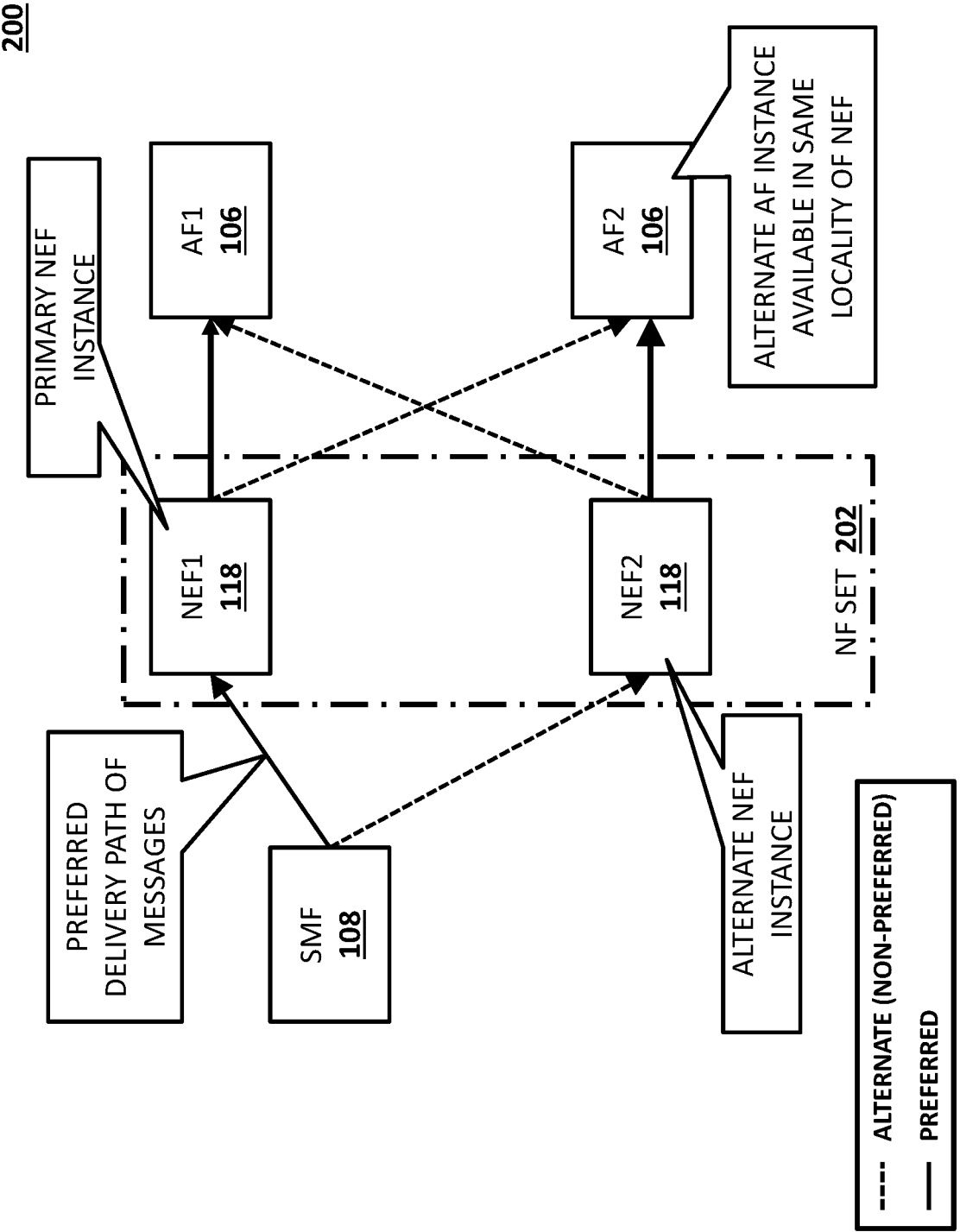
FIG. 2 is a block diagram illustrating an example scenario involving routing messages to various network functions (NFs)

FIG. 2 is a block diagram illustrating an example scenario 200 involving routing messages to various NFs. Example scenario 200 may include NEF1 118 and NEF2 118 in an NF set 202. For example, NF set 202 may represent a plurality of NFs that share or replicate context information (e.g., session information and/or binding information) and/or other data and may be usable for georedundancy or failover situations, e.g., when NEF1 118 fails during a session involving SMF 108 and AF1 106, NEF2 118 may continue the session.

In some embodiments, context information or binding information may be usable for indicating a suitable target NF instance (e.g., an AF instance) for NF service instance selection, NF service instance reselection, and routing of subsequent requests associated with a specific NF resource and/or service. For example, binding information may allow an NF producer to indicate that an NF consumer, for a particular context, should be bound to an NF service instance, NF instance, NF service set, or NF set depending on local policies and other criteria.

Notably, the binding information can be placed in the binding header of messages communicated to SMF 108 that can be used by SMF 108 and/or SCP 101 to select an alternate NEF instance during failure routing subsequent messages. For example, NEF1 118 may inform SMF 108 of fellow peer NEFs (e.g., NEF2 118) that can be used to maintain session continuity, e.g., if the original NEF (NEF1 118) fails or becomes unavailable. For example, SMF 108 may initiate the creation of a session to be established with AF1 106 via NEF1 118. During the session creation process, the NEF1 118 may include binding information in the binding header of the session response message to inform SMF 108 that if NEF1 118 becomes unavailable, then SMF 108 may contact a paired mate (e.g., NEF2 118) of NEF1 118. In particular, the paired mate can be used for continuing the session between SMF 108 and AF1 106.

Figure 3:
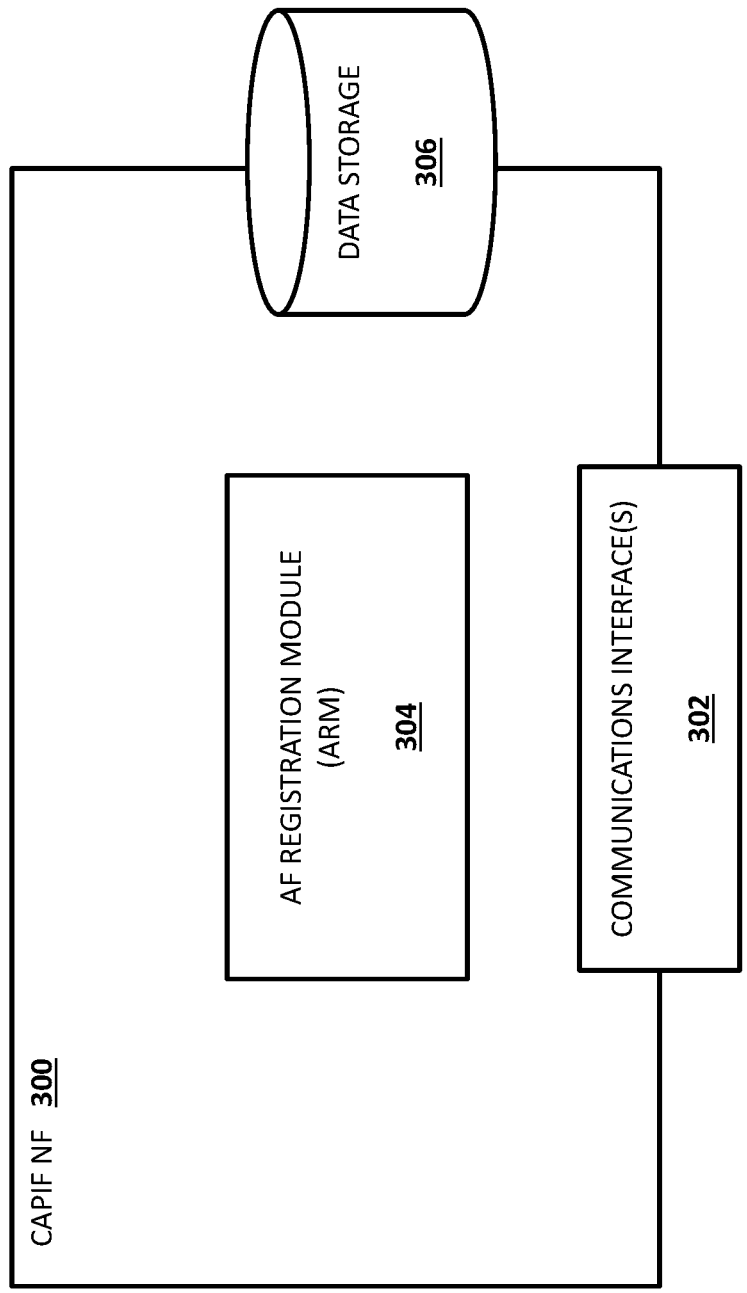
FIG. 3 is a block diagram illustrating an example common application programming interface (API) framework (CAPIF) node for registering application functions (AFs) with an NF repository function (NRF)

Thus, when an NEF1 118 has peers (e.g., other NEFs 118 included in the same NF set or NF service set) configured to share context information, NEF1 118 can also be configured to push its binding information as an NF service set or an NF set (e.g., NF set 202 in FIG. 3). Binding information sharing or related mechanism(s) allow for an alternate delivery endpoint for SMF 108 to send MO data or other information. For example, in FIG. 2, if a primary NEF instance (e.g., NEF1 118) is unavailable (e.g., NEF1 118 that handled the SMContext_Create request from SMF 108 has failed), SMF 108 may send an MO data request to a specified alternate NEF instance (e.g., NEF2 118). More specifically, SMF 108 may establish a first session with NEF1 118 (e.g., the solid arrow) and NEF1 118 can publish binding for that session with NF set 202. Further, NEF2 118 in NF Set 202 can act as the alternate NEF instance as indicated by the binding information should NEF1 118 become unavailable.

However, unlike the functionality afforded to NEFs 118 by 3GPP standards, the 3GPP standards fail to define a process for AFs 106 (outside of operator's trusted domain) to publish binding information with NEF 118 for alternate AF selection (e.g., selection of a peer AF2 106 if AF1 106 fails) during overload conditions, network failures, and/or software failures. For example, in the event of an AF endpoint failure, NEF1 118 may not have alternate routing flexibility as compared to other NFs in a 5G core network. Moreover, AFs 106 (e.g., that are located outside of an operator's trusted domain) may not register with NRF 100, thereby hindering an NEF's ability to use NRF discovery procedures for discovering alternate routing information for those AFs 106.

For example, during an NEF alternate routing process (e.g., when NEF1 118 becomes unavailable), an alternate NEF instance (e.g., NEF2 118, which is a peer of NEF1 118) may send a notification to an original AF instance (e.g., AF1 106) that has published its endpoint to original NEF1 118 during a context creation process. Thus, even if there is an alternate AF server instance (e.g., AF2 106) that is available and located in close/local proximity to alternate NEF2 118, NEF2 118 may still send a notification to a less desirable alternate AF server instance (e.g., AF1 106). As used herein, "proximity" to NEF2 118 can be understood to mean the AF is within the "locality" or "service scope" of NEF2 118.

It will be appreciated that FIG. 2 is for illustrative purposes and that various nodes and/or modules, locations, and/or functionality described above in relation to FIG. 2 may be changed, altered, added, or removed.

As indicated in FIG. 2, there is a need for systems, mechanisms, and/or techniques for allowing an NEF 118 to discover (e.g., using an NRF 100) alternate AF instances that can receive notifications during alternate routing scenarios to facilitate session continuity. Moreover, there is a need for systems, mechanisms, and/or techniques for allowing alternate routing between NEF 118 and AFs 106 based on AF location information obtained from profiles registered with NRF 100.

FIG. 3 is a diagram illustrating an example CAPIF node 300 for registering AFs 106 with NRF 100. CAPIF node 300 may represent any suitable entity or entities (e.g., one or more node(s), device(s), or computing platform(s)) for performing various aspects or functionalities described herein, e.g., registering or deregistering AFs 106 that are outside of an operator's trust domain with NRF 100. In some embodiments, CAPIF node 300 may include one or more 3GPP defined functions (e.g., a CAPIF core function (CCF) or an API exposing function (AEF)) and/or related functionality. In some embodiments, CAPIF node 300 may include an authorization server, a data repository, a network gateway, a network proxy, an edge security device, and/or other functionality.

In some embodiments, CAPIF node 300 may include a CCF or related functionality. For example, CAPIF node 300 may include or access a repository of PLMN and third party service APIs. In this example, API invokers (e.g., NFs like AFs 106 or services thereof) and AEFs may use discovery procedures to identify relevant APIs in the repository. Continuing with this example, CAPIF node 300 may also authenticate and/or authorize API invokers to use one or more of the service APIs and may also log and charge for the API invocations.

In some embodiments, CAPIF node 300 may include an AEF or related functionality. For example, CAPIF node 300 may be the provider of various services as APIs. In this example, CAPIF node 300 may validate the authorization of an API invoker, provide the service to the API invoker, and log the invocations on the CCF and request charging for the service usage. In some embodiments, CAPIF node 300 or an AEF thereof may wrap around various 3GPP functions to enable APIs to be exposed. For example, NEF APIs can be exposed to the AEF with the API invoker on top, which has access to the CCF for on-boarding and discovery and the availability of services provided by the AEF.

In some embodiments, CAPIF node 300 or a related entity may provide the capability to onboard or add new API invokers, to support granting an API invoker's request to onboard with an administrator, to support offboarding an API invoker, and/or to update an API invoker's API list, e.g., after the discovery of new API(s). For example, when onboarding itself as an API invoker at CAPIF node 300, AF1 106 may send an HTTP POST message to CAPIF node 300 or a CCF therein. In this example, the payload of the HTTP POST message may include an API invoker Enrolment Details object, an API List, and a Notification Destination uniform resource identifier (URI), e.g., as defined in 3GPP TS 29.222.

Referring to FIG. 3, CAPIF node 300 may include one or more communications interface(s) 302 for communicating messages via a communications environment, e.g., one or more 5G networks. For example, communications interface(s) 302 may include one or more communications interfaces for communicating with various entities in a home network (e.g., home public land mobile network (H-PLMN)) or a visited network (e.g., a visited public land mobile network (V-PLMN)).

CAPIF node 300 may include an AF registration module (ARM) 304. ARM 304 may be any suitable entity (e.g., software executing on at least one processor) for performing various operations associated with registering or deregistering AFs 106 at or with NRF 100. For example, ARM 304 may be configured for receiving, from an AF (e.g., AF1 106 or AF2 106), a registration trigger message comprising information about the AF; determining that the registration trigger message is valid; generating a custom NF registration message using the information about the AF; and sending the custom NF registration message to NRF 100 for registering the AF with the NRF.

In some embodiments, ARM 304 may be configured for sending (e.g., periodically) heartbeat messages to NRF 100 for keeping an AF registration valid or active. For example, depending on a heartbeat timer parameter associated with NRF 100 and after receiving a message indicating a successful profile registration, CAPIF node 300 or ARM 304 therein may periodically send an NRF heartbeat message to keep the AF profile registered at NRF 100.

In some embodiments, ARM 304 may be configured for receiving, from an AF (e.g., AF1 106 or AF2 106), a deregistration trigger message comprising information about the AF; determining that the deregistration trigger message is valid; generating a NF deregistration message using the information about the AF; and sending the NF deregistration message to NRF 100 for deregistering the AF with the NRF.

CAPIF node 300 and/or ARM 304 may access (e.g., read from and/or write information to) data storage 306. Data storage 306 may be any suitable entity (e.g., a computer readable medium or memory) for storing various data. In some embodiments, data storage 306 may include a context data store for storing session information and/or other data, a profile data store for storing AF related profiles obtained from NRF 100 (e.g., via subscription), various data stores comprising API information and/or authentication related information, and/or other information. In some embodiments, data storage 306 may include logic for performing various aspects associated with CAPIF node functions, CCF function, and/or AEF functions. In some embodiments, data storage 306 may include logic for performing various aspects of registering and deregistering AFs 106 at NRF 100. In some embodiments, data storage 306 may include logic for sending NRF heartbeat messages to NRF 100 for keeping an AF registration valid or active.

It will be appreciated that FIG. 3 and its related description are for illustrative purposes and that CAPIF node 300 may include additional and/or different modules, components, or functionality.

Figure 4:
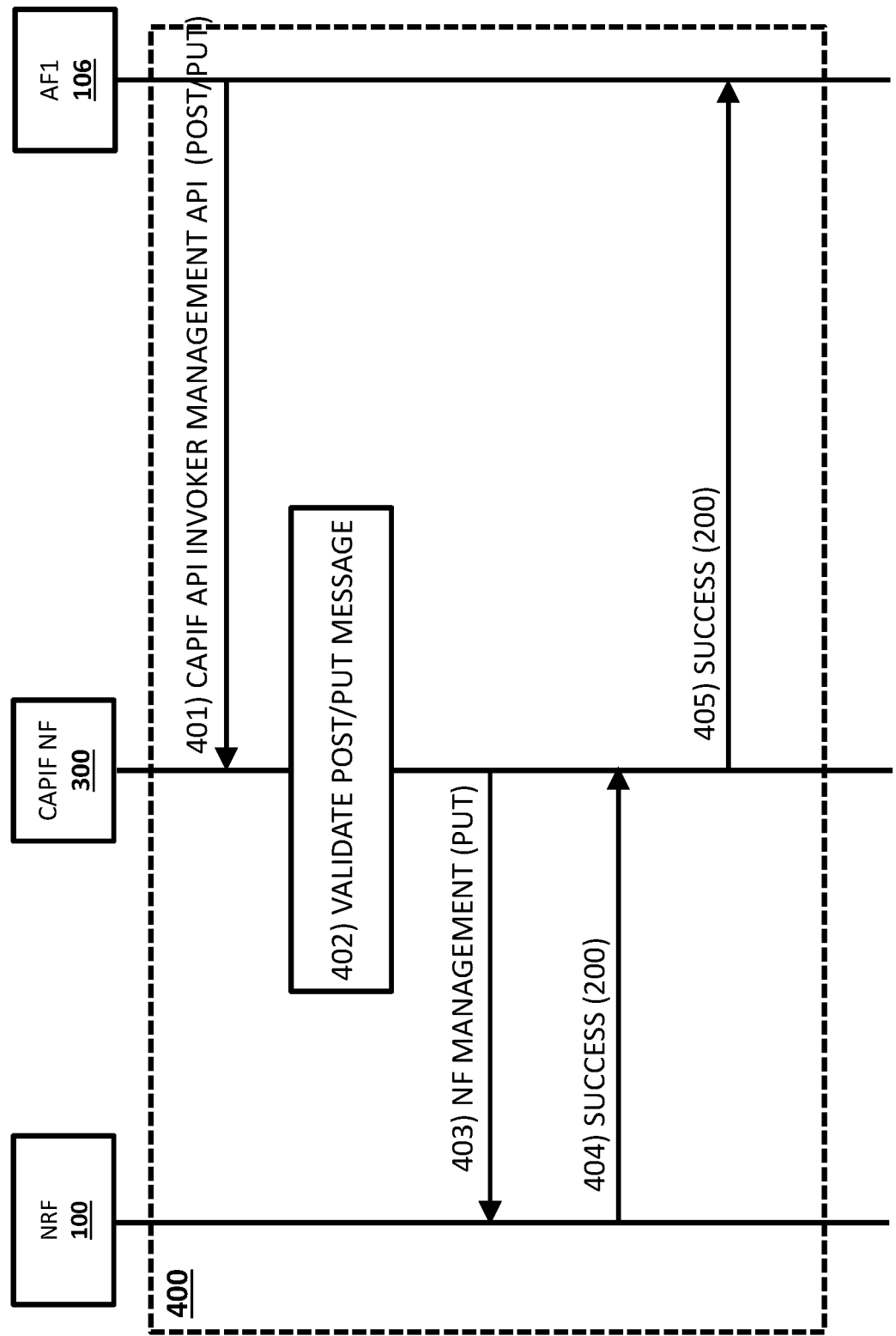
FIG. 4 is a message flow diagram illustrating an example registration process of an AF with an NRF involving a CAPIF node.

FIG. 4 is a message flow diagram illustrating an example registration process 400 registering AF1 106 with NRF 100 involving CAPIF node 300. In some embodiments, CAPIF node 300 may support an API invoker management API (e.g., as defined in 3GPP TS 29.222) for allowing an API invoker (e.g., AF1 106) to trigger various operations (e.g., registration, deregistration, etc.) involving NRF 100 via CAPIF node 300. For example, after receiving a trigger message from the API invoker, CAPIF node 300 may register AF1 106 using a custom NF registration procedure (e.g., as defined in 3GPP TS 29.510). In some embodiments, CAPIF node 300 may also perform various other functions associated with the registration, e.g., providing heartbeat messages to NRF 100 to keep AF registrations valid or active.

Referring to FIG. 4, in step 401, a registration trigger message (e.g., an API invoker management API put or post message as defined in 3GPP TS 29.222) may be sent from AF1 106 to CAPIF node 300. In some embodiments, a registration trigger message may include information usable by CAPIF node 300 for creating and storing an NF profile and/or a service profile at NRF 100 and may include information usable to allow NEFs 118 to perform alternate routing.

In some embodiments, a registration trigger message may be used for onboarding or updating an AF profile via CAPIF node 300. For example, the registration trigger message may utilize POST/PUT method as defined in API_Invoker_Management_API in 3GPP TS 29.222 and may include various attributes or parameters (e.g., JSON parameters) in an api-InvokerInformation object. For example, parameter provided in a registration trigger message (e.g., an API invoker management API put or post message) for registering AF 106 may include a location parameter indicating locality information associated with an AF; an afsets parameter indicating a list of set identifiers (e.g., setIds) shared with other alternate AF instances (which can be useful for allowing NEFs 118 to discover alternate AF instances); and/or a service endpoint list parameter indicating endpoints of AF 106 that can be used by NEF 118 for delivering notifications via alternate routing, where each endpoint may be identified by a NEF service name and network address, e.g., nef_service_name: <FQDN/IP+port address>. In another example, parameters provided in a registration trigger message (e.g., an API invoker management API put or post message) for registering AF 106 may include various parameters or information for exposure in an NF profile or service profile associated with AF 106.

In step 402, CAPIF node 300 may determine whether the registration trigger message is valid. For example, CAPIF node 300 may perform a check to determine that the API invoker is allowed to invoke an NF management API for triggering an NRF registration procedure (e.g., based on operator configuration or by determining whether the NF management API is indicated by an apiList associated with the API invoker stored at CAPIF node 300).

In step 403, a registration message (e.g., an NF management put message) for registering (or updating) an NF profile and/or service profile associated with AF1 106 at NRF 100. For example, a registration message may include information (e.g., an NF set ID list based on the "afsets" parameter and preferred locality information based on the "location" parameter) from the registration trigger message sent by AF1 106.

Table 1 (shown below) depicts various objects and related parameters associated with a given AF 106 that CAPIF node 300 can register at NRF 100. For example, as depicted in Table 1, CAPIF node 300 may register an NF profile (nfProfile) and an NF service profile at NRF 100. In this example, some parameters (e.g., the nfType parameter, the versions parameter, etc.) or information may be predetermined (e.g., agreed upon by operator(s)) and some other parameters (e.g., the nfInstanceID parameter, the locality parameter, the nfSetIdList parameter, the Fqdn/ipv4Addresses/ipv6Addresses parameter, etc.) may be based on information in the registration trigger message received from AF

TABLE 1

| Object | Parameter | Value provided by CAPIF node |
|---|---|---|
| nfProfile | nfInstanceId | Same as apiInvokerId |
| | nfType | Custom_AF (or another name) |
| | nfStatus | REGISTERED |
| | locality | Provided by AF (e.g., as "location") |
| | nfSetIdList | Provided by AF (e.g., in "afsets") |
| nfService | serviceInstanceId | apiInvokerId-<nef service name>/<unique id> |
| | serviceName | <nef service name> |
| | Fqdn/ipv4Addresses/ipv6Addresses | Provided by AF (e.g., in "service endpoint" for <nef service name> |
| | versions | V1 or custom data |
| | scheme | https |
| | nfServiceStatus | REGISTERED |

In some embodiments, a custom NF registration procedure may allow a custom NF to register with NRF 100. As indicated in 3GPP TS 29.510, when registering a custom NF, a NF type name for the custom NF should be unique to avoid collisions with other custom NF names and non-custom NF names. An example way to avoid collision is to use a naming convention that mitigates such collisions, e.g., a 'CUSTOM_' prefix to the 'AF' type.

In some embodiments, a custom NF registration message may utilize one or more objects, attributes, and/or parameters for indicating particular information about the NF profile or NF service profile to be registered. One example object or attribute usable in a custom NF registration message includes a custom Info object (e.g., as defined in 3GPP TS 29.510) for providing specific data for custom NFs.

In step 404, after the NF profile and/or service profile associated with AF1 106 is registered (and stored) at NRF 100, an registration response message (e.g., a success (200) message) indicating that the registration was successful may be sent from NRF 100 to CAPIF node 300.

In step 405, the registration response message (e.g., the success (200) message) or a similar message indicating that the registration was successful may be sent from CAPIF node 300 to AF1 106.

In some embodiments, for each registered AF profile at NRF 100, CAPIF node 300 may send an NRF heartbeat message to indicate that the AF profile is in a 'REGISTERED' state. For example, depending on a heartbeat timer parameter associated with NRF 100 and after receiving a message indicating a successful profile registration, CAPIF node 300 may periodically send an NRF heartbeat message to keep the AF profile registered.

It will be appreciated that FIG. 4 is for illustrative purposes and that different and/or additional messages and/or actions may be used. It will also be appreciated that various messages and/or actions described herein may occur in a different order or sequence. Further, while FIG. 4 depicts the registration of AF1 106, it will be appreciated that CAPIF node 300 may perform registrations and/or related operations for various AFs that requests it, e.g., via valid registration trigger messages.

Figure 5:
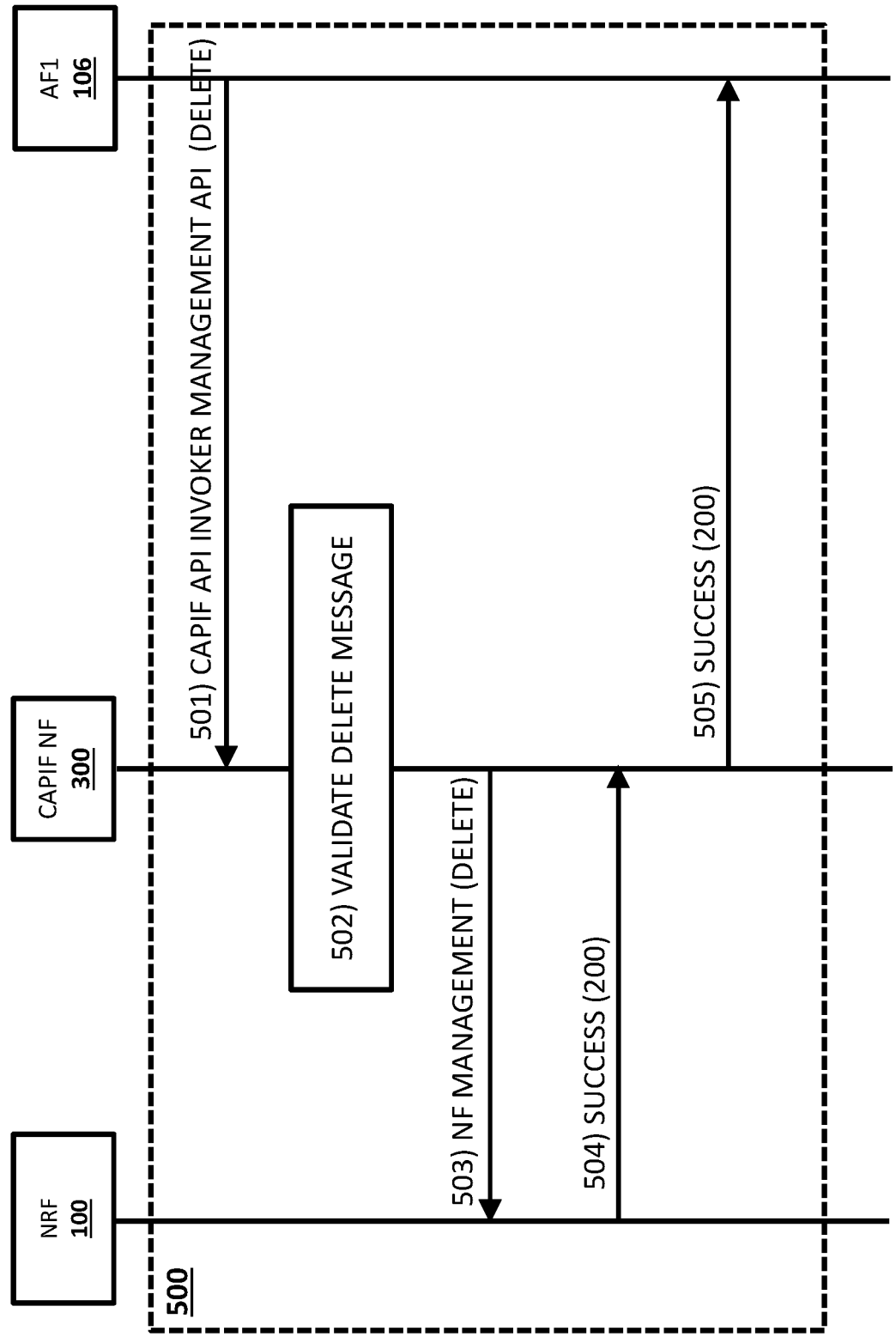
FIG. 5 is a message flow diagram illustrating an example deregistration process of an AF with an NRF involving a CAPIF node.

FIG. 5 is a message flow diagram illustrating an example deregistration process 500 involving CAPIF node 300 deregistering AF1 106 from NRF 100. In some embodiments, CAPIF node 300 may support an API invoker management API (e.g., as defined in 3GPP TS 29.222) for allowing an API invoker (e.g., AF1 106) to trigger various operations (e.g., registration, deregistration, etc.) involving NRF 100 via CAPIF node 300. For example, after receiving a trigger message from the API invoker, CAPIF node 300 may deregister AF1 106 using an NF deregistration procedure (e.g., as defined in 3GPP TS 29.510).

Referring to FIG. 5, in step 501, a deregistration trigger message (e.g., an API invoker management API delete message as defined in 3GPP TS 29.222) may be sent from AF1 106 to CAPIF node 300. In some embodiments, a registration trigger message may include information usable by CAPIF node 300 for deleting an NF profile and/or a service profile at NRF 100.

In step 502, CAPIF node 300 may determine whether the deregistration trigger message is valid. For example, CAPIF node 300 may perform a check to determine whether a profile associated with AF1 106 was previously registered by CAPIF node 300 and, if so, CAPIF node 300 may initiate an NRF deregistration procedure, e.g., as defined in 3GPP TS 29.510. In this example, this check may use an identifier (e.g., an apiInvokerId value) to find a matching entry in a local data store (e.g., a database or one or more data structures).

In step 503, a deregistration message (e.g., an NF management delete message) for deregistering (e.g., deleting) an NF profile and/or service profile associated with AF1 106 at NRF 100. For example, a deregistration message may include information (e.g., an apiInvokerId value as an nfInstanceID value) from the registration trigger message sent by AF1 106.

In step 504, after the NF profile and/or service profile associated with AF1 106 is deregistered at NRF 100, a deregistration response message (e.g., a success (200) message) indicating that the deregistration was successful may be sent from NRF 100 to CAPIF node 300.

In step 505, the deregistration response message (e.g., the success (200) message) or a similar message indicating that the deregistration was successful may be sent from CAPIF node 300 to AF1 106.

In some embodiments, after deregistration of an AF profile, CAPIF node 300 may stop sending an NRF heartbeat message to indicate that the AF profile is in a 'REGISTERED' state.

It will be appreciated that FIG. 5 is for illustrative purposes and that different and/or additional messages and/or actions may be used. It will also be appreciated that various messages and/or actions described herein may occur in a different order or sequence. Further, while FIG. 5 depicts the deregistration of AF1 106, it will be appreciated that CAPIF node 300 may perform deregistrations and/or related operations for various AFs that requests it, e.g., via valid deregistration trigger messages.

Figure 6:
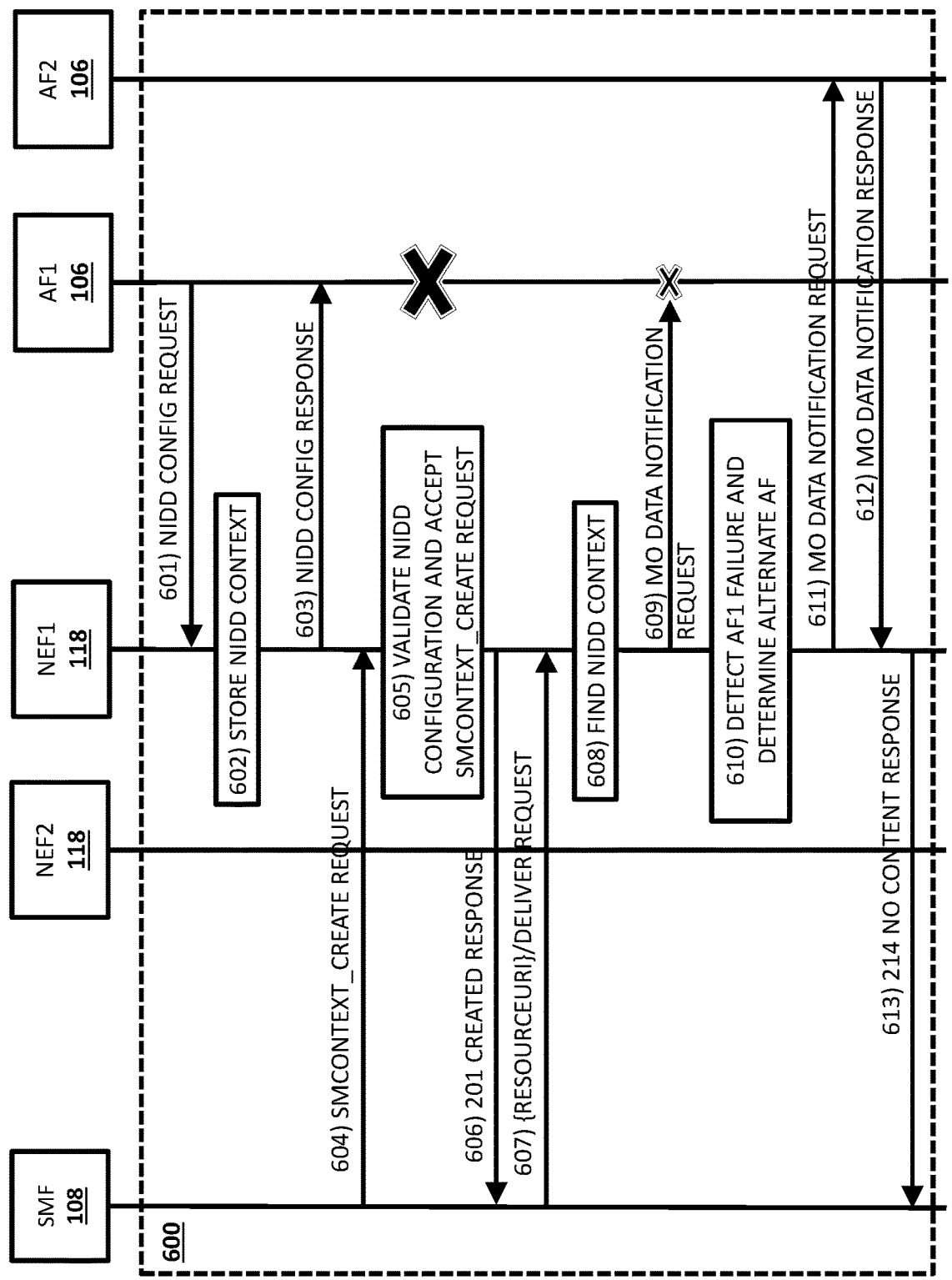
FIG. 6 is a message flow diagram illustrating an example scenario involving a notification delivery to a preferred AF instance in response to an AF failure.

FIG. 6 is a message flow diagram illustrating an example scenario 600 involving a notification delivery to a preferred AF instance in response to an AF failure. In some embodiments, scenario 600 may involve various geo-redundant NFs or context-replicated NF sets, e.g., NEF1 118 and NEF2 118 may share and/or replicate their local context data stores (e.g., via one or more replication and/or synchronization mechanisms). For example, when invoking northbound APIs at NEF1 118, AF1 106 may provide an apiInvokerId identifier as its scsAsId identifier. In such embodiments, NEF1 118 may store context data along with the scsAsId in a context data store which may be copied or otherwise shared with NEF2 118, thereby allowing NEF2 118 to perform alternate routing with AF1 106 if needed.

In some embodiments, each of NEF1 118 and NEF2 118 may be configured to subscribe with NRF 100 for obtaining all registered NF profiles associated with AFs 106 that registered via CAPIF node 300, e.g., profiles of type 'CUSTOM_AF' and storing the NF profiles in a local profiles data store. In such embodiments, when a NIDD MO data notification request message, NEF1 118 or NEF2 118 may identify, from a local context data store, a NIDD context associated with the session corresponding to the MO data notification request message and select, using that NIDD context information, an appropriate AF 106 to send the MO data notification request message.

For example, after receiving an MO delivery request message, NEF1 118 may identify a relevant NIDD context from its context data store. NEF1 118 may using an NIDD context related identifier (e.g., an scsAsId as an nfInstanceID) to fetch a stored NF profile from its profiles data store. NEF1 118 may use the NF profile to determine if the NF profile has location information indicating a preferred locality (e.g., routing location) for NEF1 118 (e.g., based on operator policy), and, if so, NEF1 118 may send an MO data notification request message toward a corresponding AF 106. If the notification delivery fails or if the NF profile does not indicate a preferred locality, NEF1 118 may select an alternate profile indicating an AF 106 for receiving the MO data notification request message, e.g., via a 3GPP defined 5GC selection procedure. If delivery fails, NEF1 118 may find another alternative AF 106 (e.g., an AF instance that is mated to AF 106 and is local to NEF1 118).

In some embodiments, NEF1 118 and NEF2 118 may obtain authentication details from CAPIF node 300 to provide authentication credentials if needed. For example, if a profile of a corresponding AF 106 (or application server) in an NF profile has its scheme as "https", NEF 118 may utilize or invoke a CAPIF node_Security_API procedure (e.g., /trustedInvokers/{apiInvokerId} GET call) defined in 3GPP TS 29.222 to obtain authentication details from CAPIF node 300.

Referring to FIG. 6, in step 601, NEF1 118 may receive a configuration request message (e.g., a NIDD configuration request) from AF1 106.

In step 602, after receiving the configuration request message, NEF1 118 may store the NIDD context information contained in the configuration request message in its context data store.

In step 603, after the information is stored in the context data store, NEF1 118 may send a configuration response message (e.g., NIDD configuration response) to AF1 106.

As depicted in scenario 600, AF1 106 may fail or otherwise become unavailable after receiving the configuration response message (as shown by the large "X" in FIG. 6).

In step 604, e.g., after the NIDD context information is stored, NEF1 118 may receive a context creation request message (e.g., SMContext_Create request) from SMF 108.

In step 605, after receiving the context creation request message, NEF1 118 may validate the previously stored NIDD configuration related to AF1 106. If the NIDD configuration is valid, NEF1 118 may accept and process the context creation request message.

In step 606, after validating the NIDD configuration and processing the context creation request message, NEF1 118 may send a context creation acknowledgment message (e.g., a '201 Created message') to SMF 108 to indicate the successful validation.

In step 607, SMF 108 may send to NEF1 118 a mobile originated (MO) delivery request message (e.g., a {resourceURI}/deliver request message) that contains MO data from a sending user equipment (not shown) serviced by SMF 108.

In step 608, after receiving the MO delivery request message, NEF1 118 may find or attempt to find NIDD context information in its local context data store and may use the NIDD context information and a relevant AF profile previously obtained from NRF 100 (e.g., via an NRF subscription) to determine that AF1 106 is already associated with the associated preferred locality and should be the destination for an MO data notification request message.

In step 609, NEF1 118 may send an MO data notification request message to AF1 106. However, the delivery of the MO data notification request message may fail because AF1 106 is unavailable.

In step 610, NEF1 118 may detect or determine that AF1 106 has failed and may determine alternate routing. For example, using its context data store and AF profiles obtained from NRF 100, NEF1 118 may find a relevant NIDD context information and using the NIDD context information to identify AF2 106 as an alternate destination. In this example, when NEF1 118 is determining an alternate AF instance for alternate routing purposes, NEF1 118 may identify or select an AF instance that has a same set identifier as the original AF1 106 as indicated by its profile (e.g., a same nfSetId in the nfSetIdList parameter of the AF profile). In another example, NEF1 118 may select an alternate AF instance that has a same set identifier as the original AF1 106 and is associated with the same preferred locality of NEF1 118 or that is local to NEF1 118.

In step 611, NEF1 118 may send an MO data notification request message to AF2 106.

In step 612, after receiving the MO data notification request message, AF2 106 may respond by directing an MO data notification response message to NEF1 118.

In step 613, NEF1 118 may send a no content acknowledgment message 713 to SMF 108 indicating the successful delivery.

It will be appreciated that FIG. 6 is for illustrative purposes and that different and/or additional messages and/or actions may be used. It will also be appreciated that various messages and/or actions described herein related to scenario 600 may occur in a different order or sequence.

Figure 7:
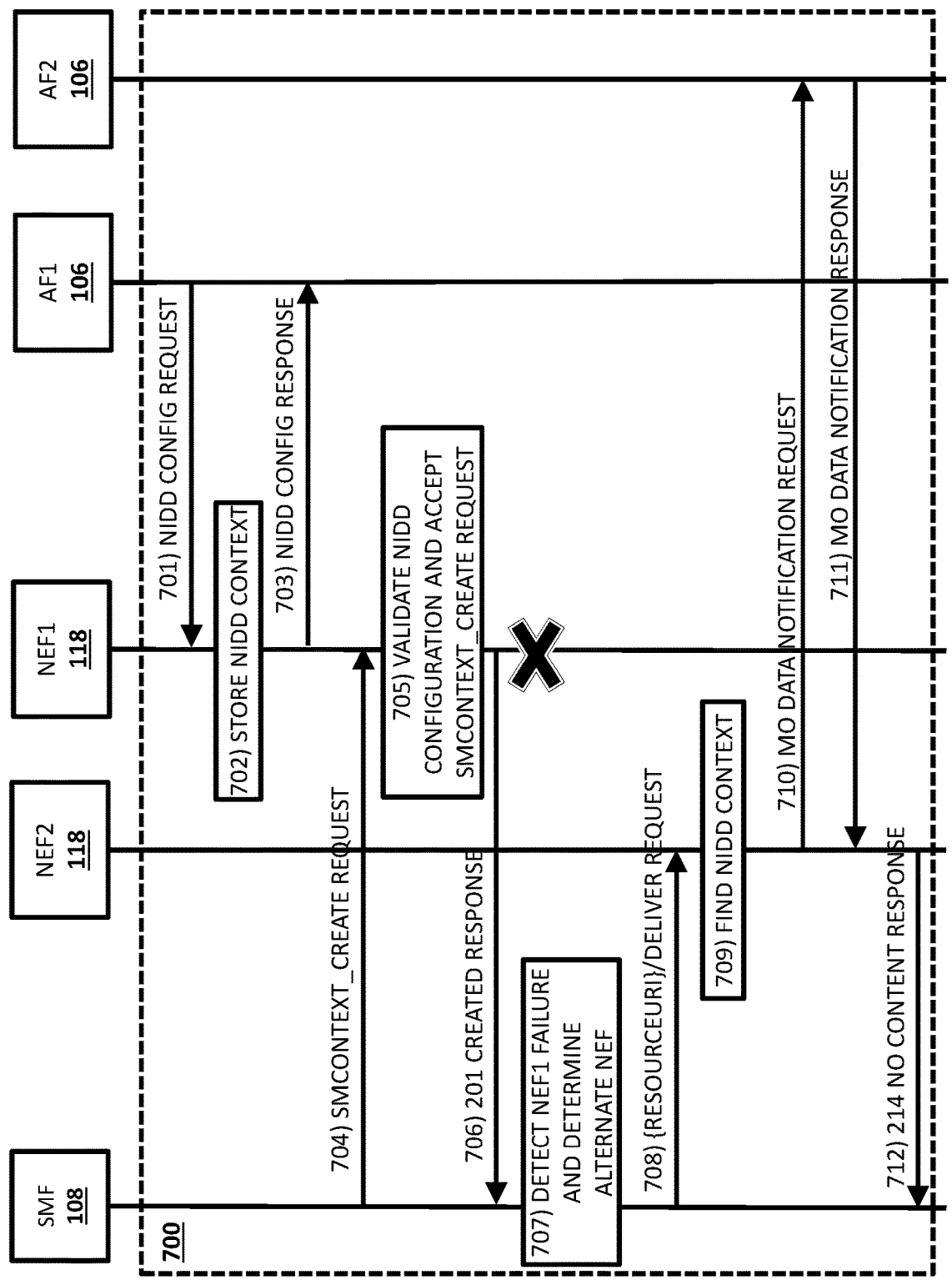
FIG. 7 is a message flow diagram illustrating an example scenario involving a notification delivery to a preferred AF instance in response to a network exposure function (NEF) failure.

FIG. 7 is a message flow diagram illustrating an example scenario 700 involving a notification delivery to a preferred AF instance in response to an NEF failure. In some embodiments, scenario 700 may involve various geo-redundant NFs or context-replicated NF sets, e.g., NEF1 118 and NEF2 118 may share and/or replicate their local context data stores (e.g., via one or more replication and/or synchronization mechanisms). For example, when invoking northbound APIs at NEF1 118, AF1 106 may provide an apiInvokerId identifier as its scsAsId identifier. In such embodiments, NEF1 118 may store context data along with the scsAsId in a context data store which may be copied or otherwise shared with NEF2 118, thereby allowing NEF2 118 to perform alternate routing with AF1 106 if needed.

In some embodiments, each of NEF1 118 and NEF2 118 may be configured to subscribe with NRF 100 for obtaining all registered NF profiles associated with AFs 106 that registered via CAPIF node 300, e.g., profiles of type 'CUSTOM_AF' and storing the NF profiles in a local profiles data store. For example, the subscribed-to profiles may include profiles of AF instances that are mated to a given AF. In such embodiments, when a NIDD MO data notification request message, NEF1 118 or NEF2 118 may identify, from a local context data store, a NIDD context associated with the session corresponding to the MO data notification request message and select, using that NIDD context information, an appropriate AF 106 to send the MO data notification request message.

For example, after receiving an MO delivery request message, NEF1 118 may identify a relevant NIDD context from its context data store. NEF1 118 may using an NIDD context related identifier (e.g., an scsAsId as an nfInstanceID) to fetch a stored NF profile from its profiles data store. NEF1 118 may use the NF profile to determine if the NF profile has location information indicating a preferred locality (e.g., routing location) for NEF1 118 (e.g., based on operator policy), and, if so, NEF1 118 may send an MO data notification request message toward a corresponding AF 106. If the notification delivery fails or if the NF profile does not indicate a preferred locality, NEF1 118 may select an alternate profile indicating an AF 106 for receiving the MO data notification request message, e.g., via a 3GPP defined 5GC selection procedure. If delivery fails, NEF1 118 may find another alternative AF 106 (e.g., a preferred locality instance of AF 106).

In some embodiments, NEF1 118 and NEF2 118 may obtain authentication details from CAPIF node 300 to provide authentication credentials if needed. For example, if a profile of a corresponding AF 106 (or application server) in an NF profile has a scheme parameter of "https"), NEF 118 may utilize or invoke a CAPIF node_Security_API procedure (e.g., /trustedInvokers/{apiInvokerId} GET call) defined in 3GPP TS 29.222 to obtain authentication details from CAPIF node 300.

Referring to FIG. 7, in step 701, NEF1 118 may receive a configuration request message (e.g., a NIDD configuration request) from AF1 106.

In step 702, after receiving the configuration request message, NEF1 118 may store the NIDD context information contained in the configuration request message in its context data store.

In step 703, after the information is stored in the context data store, NEF1 118 may send a configuration response message (e.g., NIDD configuration response) to AF1 106.

In step 704, e.g., after the NIDD context information is stored, NEF1 118 may receive a context creation request message (e.g., SMContext_Create request) from SMF 108.

In step 705, after receiving the context creation request message, NEF1 118 may validate the previously stored NIDD configuration related to AF1 106. If the NIDD configuration is valid, NEF1 118 may accept and process the context creation request message.

In step 706, after validating the NIDD configuration and processing the context creation request message, NEF1 118 may send a context creation acknowledgment message (e.g., a '201 Created message') with its NFSet binding information to SMF 108 to indicate the successful validation.

As depicted in scenario 700, NEF1 118 may fail or otherwise become unavailable after sending the context creation acknowledgment message (as shown by the "X" in FIG. 7).

In step 707, after receiving the context creation acknowledgment message, SMF 108 may detect or determine that NEF1 118 has failed and may determine alternate routing, e.g., based on binding header information previously received in the context creation acknowledgment message.

In step 708, SMF 108 may send to alternate NEF2 118 an MO delivery request message (e.g., a {resourceURI}/deliver request message) that contains MO data from a sending user equipment (not shown) serviced by SMF 108.

In step 709, after receiving the MO delivery request message, NEF2 118 may find or attempt to find NIDD context information in its local context data store and may use the NIDD context information and a relevant AF profile previously obtained from NRF 100 (e.g., via an NRF subscription) to identify AF2 106 as an alternate destination for an MO data notification request message. For example, NEF2 118 may correlate and/or associate AF profiles (e.g., received from NRF 100 via subscription) based on one or more set identifiers (e.g., nfSetIds in an nfSetIdList parameter) in those profiles. In this example, when NEF2 118 is determining an alternate AF instance for alternate routing purposes, NEF2 118 may identify or select an AF instance that has a same set identifier as the original AF1 106 as indicated by its profile (e.g., a same nfSetId in the nfSetIdList parameter of the AF profile). In another example, NEF2 118 may select an alternate AF instance that has a same set identifier as the original AF1 106 and is associated with the same preferred locality of NEF2 118 or that is local to NEF2 118.

In step 710, NEF2 118 may send an MO data notification request message to AF2 106.

In step 711, after receiving the MO data notification request message, AF2 106 may respond by directing an MO data notification response message to NEF2 118.

In step 712, NEF2 118 may send a no content acknowledgment message 713 to SMF 108 indicating the successful delivery.

It will be appreciated that FIG. 7 is for illustrative purposes and that different and/or additional messages and/or actions may be used. It will also be appreciated that various messages and/or actions described herein related to scenario 700 may occur in a different order or sequence.

Figure 8:
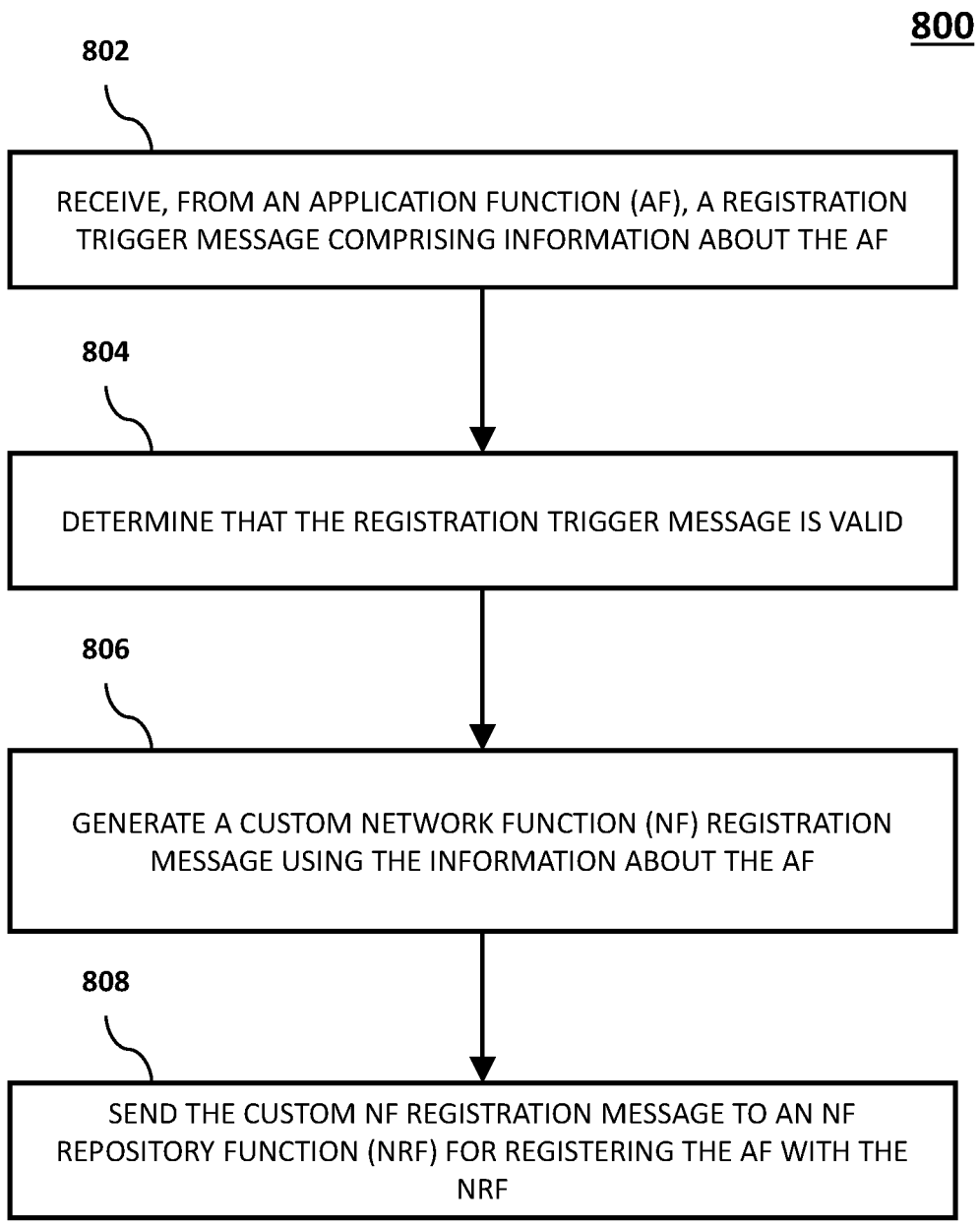
FIG. 8 is a flow chart illustrating an example process for registering AFs using CAPIF.

FIG. 8 is a diagram illustrating an example process 800 for registering AFs using CAPIF. In some embodiments, example process 800 described herein, or portions (e.g., operations or steps) thereof, may be performed at or performed by CAPIF node 300, ARM 304, and/or another module, NF, or node.

Referring to process 800, in step 802, a registration trigger message comprising information about an AF (e.g., AF1 106) may be received.

In step 804, it may be determined that the registration trigger message is valid. For example, based on operator configuration or a related CAPIF node data check, CAPIF node 300 may determine that AF1 106 is allowed to trigger an NRF registration procedure for a custom NF and/or using a custom Info object.

In step 806, a custom NF registration message may be generated using the information about the AF; and In step 806, the custom NF registration message may be sent to NRF 100.

In some embodiments, after an AF (e.g., AF1 106) is registered at NRF 100, CAPIF node 300 may be configured for periodically sending at least one heartbeat message to the NRF for keeping the AF registered.

In some embodiments, a registration trigger message may include location information indicating a preferred locality for an AF (e.g., AF1 106), information indicating at least one set identifier for identifying peer or mated AF instances (e.g., an "afsets" parameter comprising one or more set identifiers usable for identifying mated AFs), or a list of service endpoints for receiving notifications or related messages.

In some embodiments, a custom NF registration message may include information for registering or storing an NF profile or an NF service profile associated with the AF.

In some embodiments, CAPIF node 300 may be configured for receiving, from an AF (e.g., AF1 106), a deregistration trigger message comprising information about the AF; determining that the deregistration trigger message may be valid; generating a NF deregistration message using the information about the AF; and sending the NF deregistration message to NRF 100 for deregistering or deleting an NF profile or an NF service profile associated with the AF.

In some embodiments, a first NEF (e.g., NEF1 118) may be configured for subscribing, to NRF 100, for receiving AF profiles (e.g., profiles from AFs 106 registered with NRF 100 via CAPIF node 300); receiving the AF profiles (including profiles of mated AF instances); receiving an MO data delivery request message associated with a session created at a second NEF (e.g., NEF2 118); identifying stored context information associated with the MO data delivery request message; determining, a first profile associated with a particular AF (e.g., AF1 106) of the AF profiles; using the stored context information; determining, using the first profile, an alternate AF (e.g., AF2 106) and a service endpoint for receiving an MO data notification request message associated with the MO data delivery request message; and sending the MO data notification request message to the alternate AF via the service endpoint.

In some embodiments, identifying stored context information may include using an identifier (e.g., an scsAsID value) associated with the MO data delivery request message as a lookup value in one or more data stores.

In some embodiments, determining a first profile may include using an identifier (e.g., an scsAsID value) associated with an MO data delivery request message as a lookup value in one or more data stores (e.g., an AF profile data store).

In some embodiments, determining an alternate AF (e.g., AF2 106) may include selecting the alternate AF (e.g., AF2 106 which is a peer or mated AF instance of the original AF1 106) indicated by a set identifier in a first profile (e.g., the profile of the original AF1 106) and optionally based on a preferred locality indicated by the first profile. For example, NEF1 118 may subscribe to and receive AF profiles from NRF 100 and store the AF profiles locally (e.g., each AF 106 outside of operator's trusted domain may have previously registered with NRF 100 via CAPIF node 300). In this example, NEF1 118 may correlate and/or associate the AF profiles based on one or more set identifiers (e.g., nfSetIds in an nfSetIdList parameter) in those profiles. Continuing this example, when NEF1 118 is determining an alternate AF instance for alternate routing purposes, NEF1 118 may identify or select an AF instance that has a same set identifier as the original AF1 106 as indicated by its profile (e.g., a same nfSetId in the nfSetIdList parameter of the AF profile). In another example, NEF1 118 may select an alternate AF instance that has a same set identifier as the original AF1 106 and is associated with the same preferred locality of NEF1 118 or that is local to NEF1 118.

In some embodiments, CAPIF node 300 may include a CCF or an AEF.

It will be appreciated that process 800 is for illustrative purposes and that different and/or additional actions may be used. It will also be appreciated that various actions described herein may occur in a different order or sequence.

It will be appreciated that while some aspects of the subject matter described herein has been discussed with reference to 5G networks various other networks may utilize some aspects of the subject matter described herein. For example, any network that allows or utilizes CAPIF node or CAPIF node-like functions may use features, systems, mechanisms, and/or techniques described herein to perform or facilitate AF registrations at NRFs 100 or similar nodes, thereby reducing issues associated with alternate routing of notifications or other messages to AFs 106.

It should be noted that the subject matter described herein includes a practical solution for supporting alternate routing capabilities that permits a network operator to promptly manage AF failures or downtime scenarios by failing over to a preferred or appropriate alternate AF (e.g., an AF instance of the same locality as the current (alternate) NEF 118). Notably, this solution enables high availability between the network operator's NEF and the AF instances hosted by one or more vendor entities. This solution also provides or enhances the capability of CAPIF node 300 to manage AF profiles at NRF 100, e.g., via 3GPP defined procedures for custom NF registration, de-registration, subscription, etc. This solution also enables NEFs 118 to be configured for discovering custom profiles of AFs 106 and perform alternate routing to AFs 106 based on NF profile data and/or service profile data thereof. For example, CAPIF node 300 may be configured to use an NRF custom NF profile registration procedure to enable dynamic registration or deregistration of AF1 106 and NEF1 118 may be configured to use 3GPP defined NRF discovery procedures to determine alternate routing for AF1 106. As such, this solution provides a technical advancement, e.g., due to its efficiency in terms of maintainability and serviceability by the network operator.

It should be noted that CAPIF node 300, ARM 304, and/or functionality described herein may constitute a special purpose computing device. Further, CAPIF node 300, ARM 304, and/or functionality described herein can improve the technological field of network communications. For example, CAPIF node 300 may include ARM 304 and may be capable of registering AFs 106 at NRF 100, thereby allowing NEF 118 to use NRF discovery procedures to discover preferred alternate routing endpoints of AFs 106 (e.g., based on the registered AF profiles).

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 23.222; 3rd Generation Partnership Project; Technical Specification Group Services and System Aspects; Functional architecture and information flows to support Common API Framework for 3GPP Northbound APIs; Stage 2 (Release 16); V16.10.0 (2021-06).
2. 3GPP TS 29.222; 3rd Generation Partnership Project; Technical Specification Group Core Network and Terminals; Common API Framework for 3GPP Northbound APIs; (Release 16); V16.7.0 (2021-06).
3. 3GPP TS 29.510; 3rd Generation Partnership Project; Technical Specification Group Core Network and Terminals; 5G System; Network Function Repository Services; Stage 3 (Release 16); V16.9.0 (2021-09).
4. 3GPP TS 29.522; 3rd Generation Partnership Project; Technical Specification Group Core Network and Terminals; 5G System; Network Exposure Function Northbound APIs; Stage 3 (Release 16); V16.9.0 (2021-09).
5. 3GPP TS 29.122; 3rd Generation Partnership Project; Technical Specification Group Core Network and Terminals; T8 reference point for Northbound APIs; (Release 16); V16.11.0 (2021-09).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for registering application functions (AFs) using common application programming interface (API) framework (CAPIF), the method comprising:
   at a common application programming interface (API) framework (CAPIF) node comprising at least one processor:
      receiving, from an application function (AF), a registration trigger message comprising information about the AF;
      determining that the registration trigger message is valid;
      generating a custom network function (NF) registration message using the information about the AF;
      sending the custom NF registration message to an NF repository function (NRF) for registering the AF with the NRF;
      receiving, from the AF, a deregistration trigger message comprising information about the AF;
      determining that the deregistration trigger message is valid;
      generating a NF deregistration message using the information about the AF; and
      sending the NF deregistration message to the NRF for deregistering or deleting an NF profile or an NF service profile associated with the AF.

2. The method of claim 1 wherein after the AF is registered at the NRF, periodically sending, by the CAPIF node, at least one heartbeat message to the NRF for keeping the AF registered.

3. The method of claim 1 wherein the registration trigger message includes location information indicating a preferred locality for the AF, at least one set identifier for identifying mated AF instances, or a list of service endpoints for receiving notifications or related messages.

4. The method of claim 1 wherein the custom NF registration message includes information for registering or storing an NF profile or an NF service profile associated with the AF.

5. The method of claim 1 wherein the CAPIF node includes a CAPIF core function (CCF) or an API exposing function (AEF).

6. A method for registering application functions (AFs) using common application programming interface (API) framework (CAPIF), the method comprising:
   at a common application programming interface (API) framework (CAPIF) node comprising at least one processor:
      receiving, from an application function (AF), a registration trigger message comprising information about the AF;
      determining that the registration trigger message is valid;
      generating a custom network function (NF) registration message using the information about the AF; and
      sending the custom NF registration message to an NF repository function (NRF) for registering the AF with the NRF; and
   at a first network exposure function (NEF):
      subscribing, to the NRF, for receiving AF profiles registered using the CAPIF node;
      receiving the AF profiles, wherein the AF profiles includes profiles of AF instances mated to the AF; and
      receiving a mobile originated (MO) data delivery request message associated with a session created at a second NEF;
      identifying stored context information associated with the MO data delivery request message;
      determining, a first profile associated with the AF of the AF profiles; using the stored context information;
      determining, using the first profile, an alternate AF and a service endpoint for receiving an MO data notification request message associated with the MO data delivery request message; and
      sending the MO data notification request message to the alternate AF via the service endpoint.

7. The method of claim 6 wherein determining the first profile includes using an identifier associated with the MO data delivery request message as a lookup value in one or more data stores.

8. The method of claim 6 wherein determining the alternate AF includes selecting the alternate AF indicated by a set identifier in the first profile and optionally based on a preferred locality indicated by the first profile.

9. A system for registering application functions (AFs) using common application programming interface (API) framework (CAPIF), the system comprising:
   at least one processor;
   a memory; and
   a common application programming interface (API) framework (CAPIF) node implemented using the at least one processor and the memory, the CAPIF node configured for:
- receiving, from an application function (AF), a registration trigger message comprising information about the AF;
- determining that the registration trigger message is valid;
- generating a custom network function (NF) registration message using the information about the AF;
- sending the custom NF registration message to an NF repository function (NRF) for registering the AF with the NRF;
- receiving, from the AF, a deregistration trigger message comprising information about the AF;
- determining that the deregistration trigger message is valid;
- generating a NF deregistration message using the information about the AF; and
- sending the NF deregistration message to the NRF for deregistering or deleting an NF profile or an NF service profile associated with the AF.

10. The system of claim 9 wherein the CAPIF node is configured for after the AF is registered at the NRF, periodically sending at least one heartbeat message to the NRF for keeping the AF registered.

11. The system of claim 9 wherein the registration trigger message includes location information indicating a preferred locality for the AF, at least one set identifier for identifying mated AF instances, or a list of service endpoints for receiving notifications or related messages.

12. The system of claim 9 wherein the custom NF registration message includes information for registering or storing an NF profile or an NF service profile associated with the AF.

13. The system of claim 9 wherein the CAPIF node includes a CAPIF core function (CCF) or an API exposing function (AEF).

14. A system for registering application functions (AFs) using common application programming interface (API) framework (CAPIF), the system comprising:
- at least one processor;
- a memory; and
- a common application programming interface (API) framework (CAPIF) node implemented using the at least one processor and the memory, the CAPIF node configured for:
  - receiving, from an application function (AF), a registration trigger message comprising information about the AF;
  - determining that the registration trigger message is valid;
  - generating a custom network function (NF) registration message using the information about the AF; and
  - sending the custom NF registration message to an NF repository function (NRF) for registering the AF with the NRF; and
- a first network exposure function (NEF), wherein the first NEF is configured for:
  - subscribing, to the NRF, for receiving AF profiles registered using the CAPIF node;
  - receiving the AF profiles, wherein the AF profiles includes profiles of AF instances mated to the AF; and
  - receiving a mobile originated (MO) data delivery request message associated with a session created at a second NEF;
  - identifying stored context information associated with the MO data delivery request message;
  - determining, a first profile associated with the AF of the AF profiles; using the stored context information;
  - determining, using the first profile, an alternate AF and a service endpoint for receiving an MO data notification request message associated with the MO data delivery request message; and
  - sending the MO data notification request message to the alternate AF via the service endpoint.

15. The system of claim 14 wherein the first NEF is configured for determining the first profile by using an identifier associated with the MO data delivery request message as a lookup value in one or more data stores.

16. The system of claim 14 wherein the first NEF is configured for identifying the stored context information by using an identifier associated with the MO data delivery request message as a lookup value in one or more data stores.

17. The system of claim 14 wherein the first NEF is configured for determining the alternate AF by selecting the alternate AF indicated by a set identifier in the first profile and optionally based on a preferred locality indicated by the first profile.

18. A non-transitory computer readable medium having stored thereon executable instructions that when executed by at least one processor of a computer cause the computer to perform steps comprising:
- at a common application programming interface (API) framework (CAPIF) node comprising at least one processor:
  - receiving, from an application function (AF), a registration trigger message comprising information about the AF;
  - determining that the registration trigger message is valid;
  - generating a custom network function (NF) registration message using the information about the AF;
  - sending the custom NF registration message to an NF repository function (NRF) for registering the AF with the NRF;
  - receiving, from the AF, a deregistration trigger message comprising information about the AF;
  - determining that the deregistration trigger message is valid;
  - generating a NF deregistration message using the information about the AF; and
  - sending the NF deregistration message to the NRF for deregistering or deleting an NF profile or an NF service profile associated with the AF.

* * * * *

UNITED STATES PATENT AND TRADEMARK OFFICE
CERTIFICATE OF CORRECTION

| | |
|---|---|
| PATENT NO. | : 11,765,030 B2 |
| APPLICATION NO. | : 17/541230 |
| DATED | : September 19, 2023 |
| INVENTOR(S) | : Krishan et al. |

It is certified that error appears in the above-identified patent and that said Letters Patent is hereby corrected as shown below:

In the Specification

In Column 9, Line 46, delete "AF" and insert -- AF 106. --, therefor.

In Column 9, Line 54, delete "byAF" and insert -- by AF --, therefor.

In Column 9, Line 58, delete "byAF" and insert -- by AF --, therefor.

Signed and Sealed this
Eighteenth Day of June, 2024

Katherine Kelly Vidal
*Director of the United States Patent and Trademark Office*